July 23, 1946. L. W. VINAL 2,404,671
MOLDING PROCESS
Filed Oct. 14, 1943 2 Sheets-Sheet 1

INVENTOR.
LEROY W. VINAL
BY Charles R. Fay
atty.

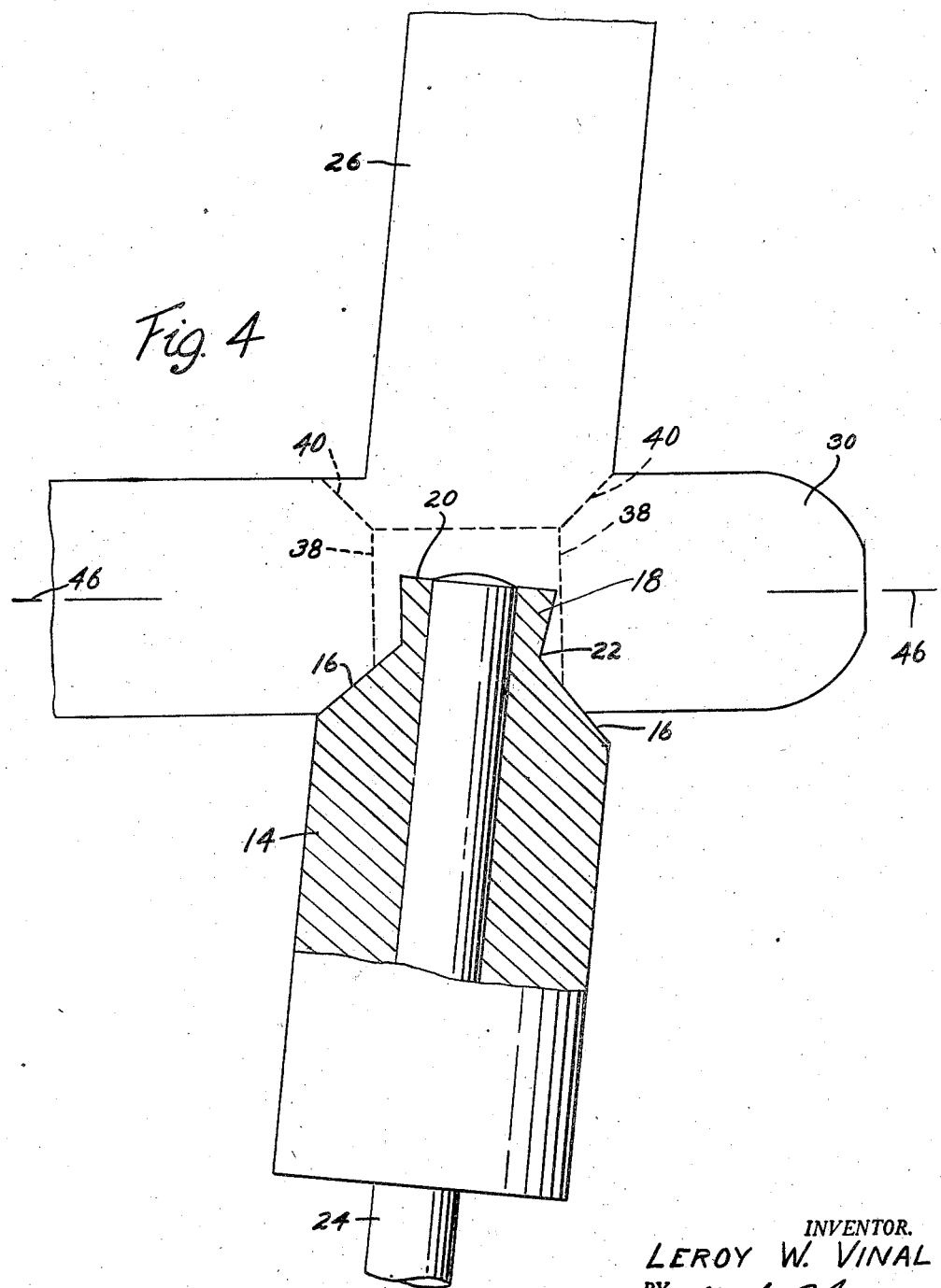

Patented July 23, 1946

2,404,671

UNITED STATES PATENT OFFICE 2,404,671

MOLDING PROCESS

Leroy W. Vinal, Leominster, Mass., assignor to E. I. du Pont de Nemours & Company, Wilmington, Del., a corporation of Delaware Application October 14, 1943, Serial No. 506,218

1 Claim. (Cl. 18—47.5)

This invention relates to improvements in the art of plastic molding.

In the molding of certain articles, such as for instance brush blanks, it has been necessary occasionally to manually extract the blanks from the molding die due to the frictional sticking of an elongated sprue which is necessary in modern molding practice, and which sometimes causes the blank to fail to separate from the die. It is the general purpose of this invention to provide a method for overcoming this deficiency in the art, and advantage is taken of the device employed using it to form a part of the molding surface of the die.

Other objects and advantages of the invention will appear hereinafter, reference being had to the accompanying drawings, in which Fig. 1 is a plan view of a die part usable in carrying out the process of the present invention, parts being broken away;

Fig. 4 is an enlarged view showing the operation of the invention and illustrating the process of manufacture.

The present invention has a general application to the plastic molding art but is herein disclosed and described for purposes of illustration as applied to the manufacture of brush handles having hanger holes or the like. Formerly it has been the practice to provide a die with a passage forming a sprue at the end of the handle and in general alignment with the axis thereof. This, however, involves finishing the handle at the point where the sprue is cut off, and therefore it is preferred to locate the sprue at the point where the hanger hole will be located, so that the sprue may be cut off and the hanger hole then drilled and counterbored at the cut off, automatically removing all traces of the sprue and obviating the necessity of finishing at the point of removal thereof.

Figure 1:
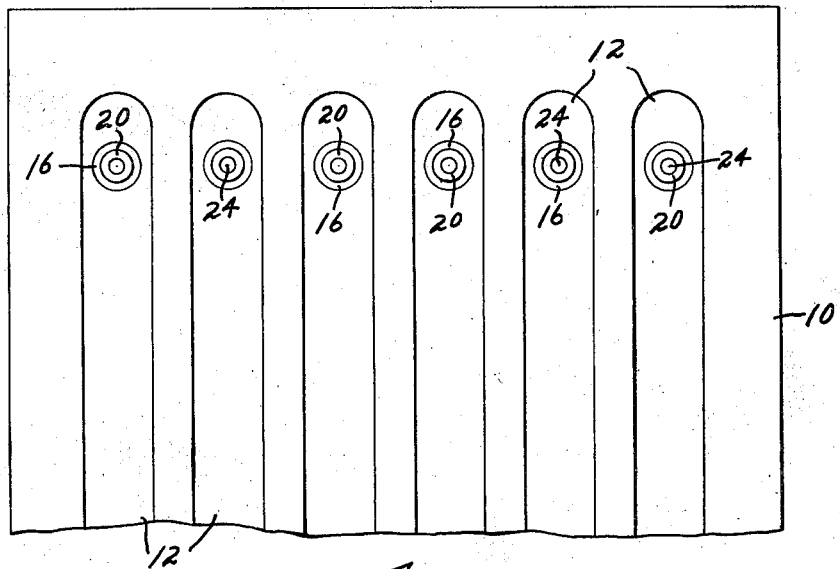

In the drawings Fig. 1 illustrates a die 10 which forms the part of the molding die by means of which the present invention is carried out. The die part 10 is provided with a series of cavities 12 which form the brush handle blanks in conjunction with supplementary cavities in another die part, not shown. The gates and sprue are located wholly within the die part not shown.

The cavities of the die part 10 are each provided with a bushing 14 as shown in Fig. 4, this bushing having a conical portion projecting through the bottom of and up into the cavity as at 16. Bushing 14 is set into the material of the die part 10 and is fixed therein for operation of the die although these bushings may be removed for repairs, etc.

Each bushing 14 is provided with a reversed frustoconical portion 18, the broad base 20 of which forms the extreme end of the bushing, in such a manner that an undercut reduced portion, as at 22, is formed intermediate the surface 20 and the cylindrical surface 16 of the bushing.

The undercut portion 22 forms a narrow or reduced neck around which the liquid plastic flows and hardens so that in effect the portion 18 is embedded and secured in the brush handle or other article being molded. Bushing 14 also provides a supporting guide for a knockout pin 24 which is located axially centrally of the bushing and is provided with some means, not shown, for projecting the pin outwardly of the bushing to knock the molded article from the bushing and thus eject the article from the die. Pin 24 is rounded to prevent injury to the operator if he should reach into the die.

Figure 2:
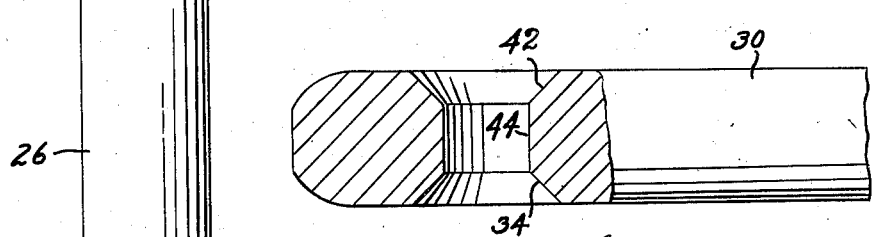
Fig. 2 is an enlarged view partly in section of a finished article.
Figure 3:
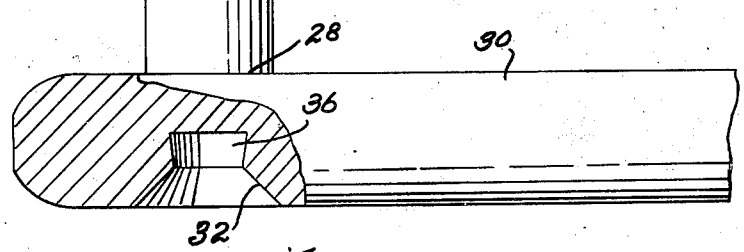
Fig. 3 is an enlarged view of the article as it comes from the die, parts being in section.

The sprue is formed in the die part not shown, such die part being located oppositely the die part 10 with respect to the bushing 14 as seen in Figs. 3 and 4. This sprue is indicated at 26 and after ejection of the article it is cut off along the line 28 in preparation for drilling and countersinking of the hanger hole. In Fig. 3 there is shown a brush handle 30 having the sprue 26 still attached just as the article comes from the die. The conical portion 16 of the bushing 14 molds the conical surface 32, in Fig. 3, forming a part of the finished hanger hole as seen at 34 in Fig. 2. The reverse conical portion 18 of the bushing molds cavity 36 which cavity lies completely within an area indicated by dotted lines 38 in Fig. 4. This area is drilled after removal of the sprue and from the direction of location of the sprue. It will be seen that the presence of the conical portion 18 provides for the cavity 36, which allows a less amount of drilling in forming the hanger hole than would be the case were portion 18 lacking. When the brush handle has been drilled at 38 it is countersunk, as at 40, to form the remainder of the hanger hole complementary to surface 32 and the brush blank will be finished, no polishing being necessary. The hanger hole thus comprises conical surface 34, a corresponding conical surface 42, and a cylindrical surface 44, as shown in Fig. 2.

Reference numeral 46 shows the location of the parting line of the die, and in Fig. 4 it will be seen that approximately one-half of the brush handle is formed by a cavity in one die part and the other half is formed by a complementary cavity in the other die part. The sprue extends through one die part as indicated in Fig. 4 and the bushing 14 is located in the other die part which is labeled 10. The Fig. 4 illustration shows the brush handle and the bushing as the elements appear in the die immediately following the molding step, and it will be noted that the bushing extends well below the cavity forming the brush handle so that the sprue extends from one side of the handle and the bushing extends from the other side. Incidentally the Fig. 4 disclosure shows a condition wherein a part of the brush is located at an angle to the handle 30 and this necessitates locating sprue 26 and bushing 14 at an angle to the article, as the sprue must be parallel to the direction of movement of the dies.

As the dies separate, the sprue is clipped off from the gate at a point remote from the brush handle 30, and this sprue will sometimes stick in its passage so that formerly the molded article had to be picked out of the sprue side of the die by hand. However, the reduced neck 22 in the bushing will cause the molded article to be withdrawn from the sprue side of the die due to the fact that the plastic material freezes around portion 18 of the bushing and this, of course, secures the bushing and the molded article together. Bushing 14 therefore causes extracting of the molded article from sprue side of the die as the dies separate and immediately thereafter pin 24 will be automatically moved in an axial direction through the bushing to knock the article from the bushing and to eject it completely out of the die. The plastic nature of the molded material will permit temporary deformation to provide for this action where the pin positively impinges on the article, but at the same time the material is rigid enough to provide that the sprue 26 will be withdrawn from its passage in the sprue side of the die, and the blank thus extracted therefrom.

From the above description it will be seen that this invention employs a molding surface at 16 on the bushing 14, which forms one of the conical surfaces of the hanger hole at 34. The invention also employs an extracting means for the molded article; and it further provides for a substantial reduction in the amount of material necessary to be removed in forming the hanger hole and by the same token less molding material is required initially, resulting in a substantial saving. The invention also completely does away with any necessity for subsequent countersinking of the surface 34. This invention speeds the production of the article in several ways; it obviates the necessity of manual removal of articles from the sprue side of the die, it obviates one countersinking operation, and it provides for more rapid drilling at 38 and more rapid countersinking at 40 because of the quality of the plastic material which causes it to melt and flow under even slight heat in cases where a relatively large amount of material is to be removed. In the present case, however, the amount of material to be removed in forming the hanger hole is greatly reduced and both the time of drilling is lessened and the speed of the drill can be increased without melting due to the reduced amount of material to be removed.

Having thus described my invention and the advantages thereof, I do not wish to be limited to the details herein disclosed, otherwise than as set forth in the claim, but what I claim is:

A method of making an elongated article such as a brush handle or the like having a hanger hole adjacent one end thereof, said opening comprising a central cylindrical portion whose axis is transverse to the longitudinal axis of the handle, and having inclined conical surfaces extending from the exterior faces of the handle to the central cylindrical portion, which method comprises casting the handle in a two part die about an insert projecting transversely through one-half of the die cavity, and having an inclined shoulder within the cavity adapted to form one of the inclined conical surfaces in the completed article and having an extension portion projecting beyond the inclined shoulder to form a part of the central cylindrical opening of the handle, introducing the molding material through a sprue opening in the other portion of the die opposite said insert substantially in alignment therewith and forming a sprue extending from said opening in a direction opposite to the aforesaid insert, allowing the molding material to harden in the two part die then separating the two parts of the die, retaining the article in the part of the die containing the insert, then ejecting the article from the last-named part of the die, leaving an elongated article with a cavity extending part way through the article through one side thereof and a sprue extending from the opposite side of the article, then finishing the article by cutting off the sprue flush with the surface of the article, drilling through the area previously occupied by the sprue to complete the transverse opening, and forming an inclined surface on the sprue side of the handle corresponding to the opposite molded inclined surface produced by the insert.

LEROY W. VINAL.